United States Patent [19]
Maham

[11] 4,331,536
[45] May 25, 1982

[54] COMBINATION FOR REMOVING HEAVIER LIQUID FROM THE BOTTOM OF A STORAGE TANK

[75] Inventor: Robert M. Maham, Beaumont, Tex.

[73] Assignee: Texaco Inc., White Plains, N.Y.

[21] Appl. No.: 167,877

[22] Filed: Jun. 14, 1980

[51] Int. Cl.³ .............................................. B01D 17/02
[52] U.S. Cl. ..................................... 210/95; 210/114; 210/128; 210/172
[58] Field of Search ................ 210/95, 114, 115, 123, 210/124, 128, 129, 167, 168, 170, 172, 194, 258, 533

[56] References Cited

U.S. PATENT DOCUMENTS

| | | | |
|---|---|---|---|
| 1,471,737 | 10/1923 | Jolly | 210/114 |
| 2,626,054 | 1/1953 | Henigman | 210/95 |
| 3,297,537 | 1/1967 | Natland | 210/114 |

Primary Examiner—Ivars C. Cintins
Attorney, Agent, or Firm—Carl G. Ries; Robert A. Kulason; Henry C. Dearborn

[57] ABSTRACT

A time saving combination of a manual pump connected with a storage tank pump and a float controlled drain valve. The connections permit circulation of liquid from the sump to the float valve and back to the storage tank while heavier liquid is allowed to drain from the valve.

4 Claims, 3 Drawing Figures

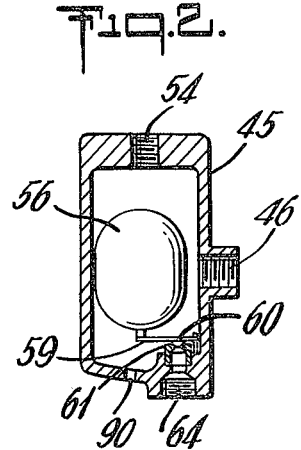
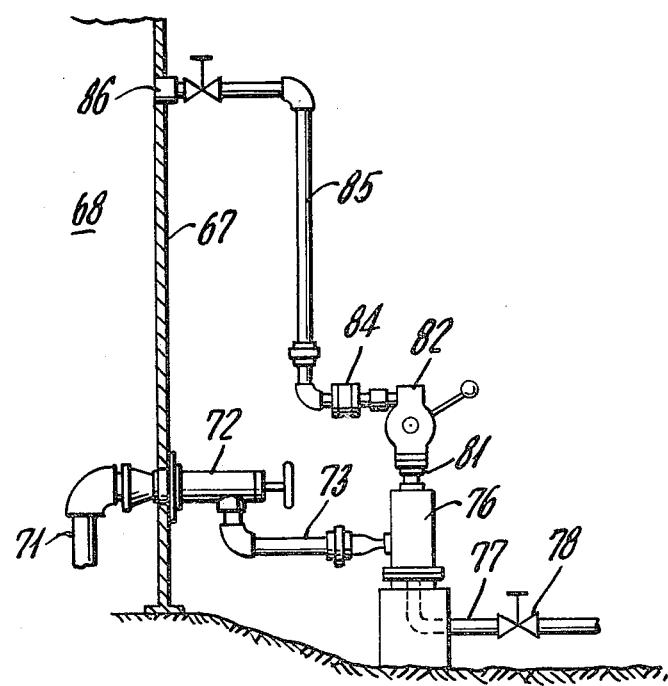

COMBINATION FOR REMOVING HEAVIER LIQUID FROM THE BOTTOM OF A STORAGE TANK

BACKGROUND OF THE INVENTION

1. Field of the Invention

This invention concerns storage of products such as petroleum products. More particularly, it is concerned with the draining of water from storage tanks of hydrocarbons such as aviation jet fuel.

1. Description of the Prior Art

In connection with storage tanks for petroleum products such as aviation fuels and the like, there has always been a problem with the removal of water which tends to gather inside the tank from various sources. Of course, such water settles to the bottom. Under present conditions it is of much increased importance to be able to remove such water from storage tanks without any loss of the hydrocarbons product from the tank. This is of course true for at least two reasons, one being the value of petroleum products in todays markets and the other being the strictures against pollution such as by reason of having petroleum products mixed with surface drainage or the like.

Heretofore, there have been various types of apparatus that are available which make use of drawing tank bottoms into a small vessel where further separation of oil and water takes place prior to drawing off the water layer for disposal. The hydrocarbon liquid is then pumped back into the main storage tank from the separate vessel. With such arrangement the liquid must be returned against the full head of the hydrocarbon in the storage tank so that a pump using electric or pneumatic power is required. Furthermore, such systems require additional equipment which adds considerably to the expense and complications.

There has been suggested in the past, a separator structure as described in U.S. Pat. No. 2,036,730 to H. A. Thompson issued Apr. 7, 1936. However, that structure is quite complex and includes various chambers and float actuated elements for creating the desired separation of liquids in order to carry out the desired removal of a heavier liquid such as water.

In addition, there are various float actuated valve structures for acting on liquids having a difference in specific gravity. Such known valves act so that the float will control a valve depending upon the effective level of a heavier one of two liquids. However, such valves have not been applied for direct action in draining the settled water in storage tanks of petroleum products where settled water is gathered in a sump and connection to the sump is made by a dip leg conduit. Such conduit extends down into the sump from above. With such an arrangement the liquid in the sump must be drawn out through the dip leg conduit in order to remove the water or whatever liquid exists at the entrance of such conduit. Consequently, no direct connection of a float valve structure would be effective to carry out the separation of the heavier liquid, without some pumping to move the heavy liquid from the sump to such valve.

It was discovered that by employing a combination according to this invention, the circulation of liquid from a storage tank sump to a float controlled valve for draining the heavy liquid may be carried out with a minimal amount of energy exertion by making use of a closed system an employing a manual pump. Thus, the circulation of the liquid from the sump to a float valve may involve a very small amount of energy easily handled by a manual pump since the closed system for circulating the liquid is at substantially no difference in pressure.

Thus, it is an object of this invention, to provide a system that requires a minimum amount of equipment and saves operating personnel much time in carrying out a routine for removal or determination of whether any water is present in a storage tank of a hydrocarbon.

SUMMARY OF THE INVENTION

Briefly, the invention is in combination with a storage tank having means for collecting heavier liquid such as water or the like at the bottom of the tank. It includes a conduit extending into said collecting means for drawing off the heavier liquid. The combination includes a float actuated valve for draining said heavier liquid, and a manual circulating pump. It also includes means for connecting said conduit to said valve and said circulating pump, and means for connecting said circulating pump to said storage tank whereby said heavier liquid is drained while said storage tank liquid is returned to the tank.

Again, briefly, the invention is in the combination of a storage tank for holding a liquid subject to accumulation of a heavier liquid at the bottom, and a sump for accumulating said heavier liquid. Also the combination includes first conduit means for connecting said sump with a chamber having a density sensitive float valve therein, and second conduit means for connecting said chamber with said storage tank. It also includes in the combination drain means from said float valve chamber for draining said heavier liquid, and a manual pump for circulating liquid through said first and second conduit means.

Once more briefly, the invention is in combination with a storage tank for jet fuel, said tank being subject to accumulation of water therein and having a sump for receiving said water beneath said jet fuel. And it is in combination with a dip leg conduit extending vertically into said sump for removing said water. In such combination the improvement comprises a drain for carrying said water, and a float actuated valve having an outlet connected to said drain. The improvement also comprises a manual pump, and a first connection from said dip leg conduit to an inlet of said float valve. Also the improvement comprises a second connection from said float valve to said manual pump, and a third connection from said manual pump into said storage tank including a sight glass for visually monitoring the liquid flow from said float valve back into said storage tank.

BRIEF DESCRIPTION OF THE DRAWINGS

The foregoing and other objects and benefits of the invention will be more fully set forth below in connection with the best mode contemplated by the inventor carrying out the invention, and in connection with which there are illustrations provided in the drawings, wherein:

FIG. 2 is a longitudinal cross section, showing a float controlled valve which may be employed as an element in the combination of the invention; and FIG. 3 is an illustration of another embodiment of the invention which shows a fragmentary portion of a storage tank to which the combination is applied.

DESCRIPTION OF THE PREFERRED EMBODIMENTS

Figure 1:
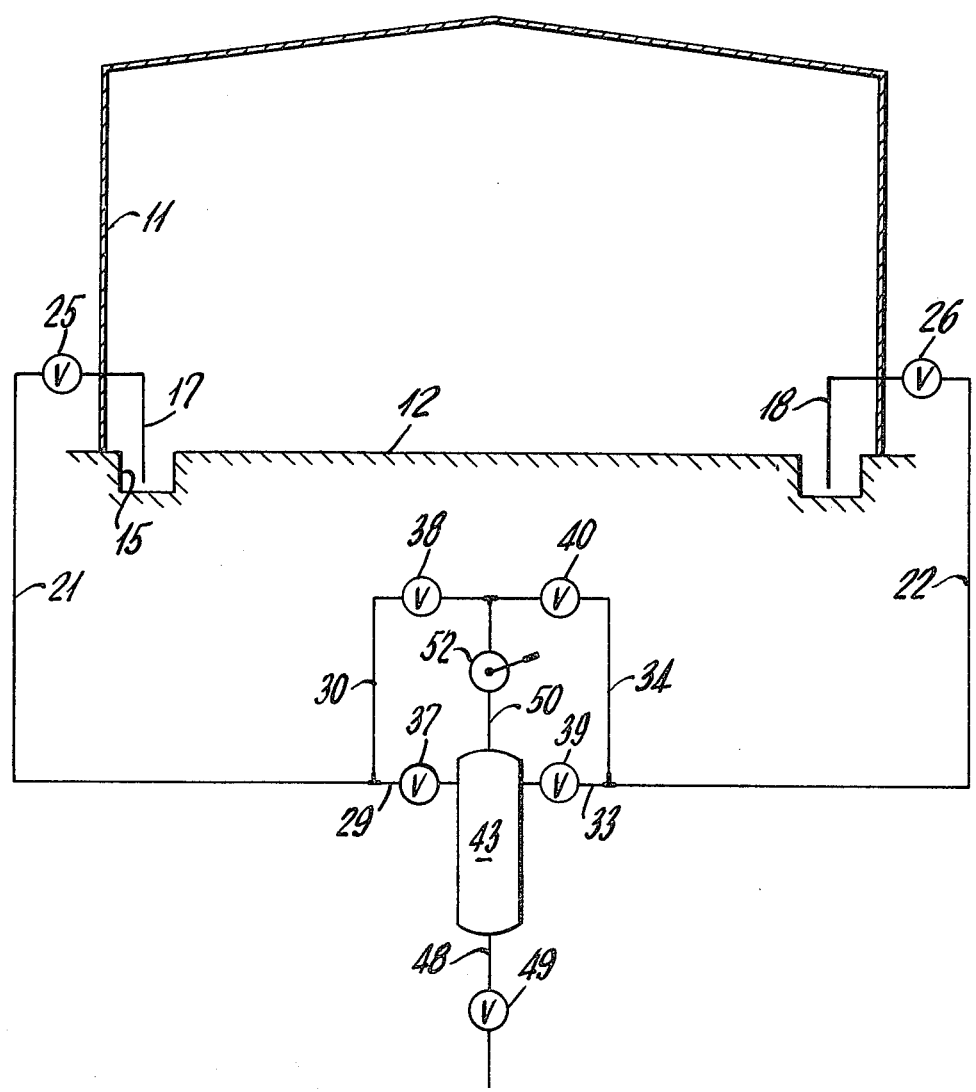
FIG. 1 is a schematic cross sectional showing of a storage tank with a combination according to the invention connected thereto.

FIG. 1 is a schematic illustration showing elements of a combination according to one embodiment of the invention. Thus, there is a storage tank 11 that is built onto the ground or other solid base 12. There are a plurality of sumps 15 and 16 located in the bottom of the tank 11 for gathering any water that tends to form inside the storage tank 11. Each sump 15 and 16 has a dip leg conduit 17 and 18 respectively that extends vertically down so as to reach near the bottom of each sump.

There are conduits 21 and 22 that connect with the dip leg conduits 17 and 18 respectively. These conduits 21 and 22 may have valves 25 and 26 respectively, connected therein.

The conduits 21 and 22 each go to branching connections shown. Conduit 21 branches into connections 29 and 30 which go to valves 37 and 38 respectively. Similarly there are branch connections 33 and 34 from the conduit 22. These branches 33 and 34 connect with valves 39 and 40 respectively.

There is a float actuated valve 43 that may take various forms, one of which is the form indicated by the FIG. 2 illustration. However, in that case, it will be understood that the connections from valves 37 and 38 to the valve 43 would be joined together to make a single connection as will appear more fully hereafter.

It will be observed in the schematic of FIG. 1 that the valve 43 has a drain connection 48 which is for carrying off any water from the bottom of the valve whenever the float opens it. The drain connection 48 may include a valve 49 therein if desired.

The valve 43 also has an outlet connection 50 that connects to the inlet of a manual pump 52. The pump 52 circulates product liquid from the valve 43 to whichever of the valves 38 or 40 is open so that the storage tank product is returned to one or the other of the sumps 15 or 16 in the storage tank 11. It will be understood that by setting a predetermined pair of the valves 37-40 the direction of circulation caused by the manual pump 52 may be reversed. Consequently, liquid may be drawn from either sump 15 or 16 and returned to the other, as desired. The usual procedure will include a circulation first from one sump to the other followed by changing the valves 37-40 so as to circulate in the other direction back from the other sump to the first.

As indicated above, FIG. 2 represents a typical float controlled valve. It has a housing 45 with an inlet port 46 in one side and an outlet port 54 in the top. The liquid inside the housing 45 will act on a float 56 which is designed to float on the heavier liquid, i.e. water as it accumulates inside the housing 45. The float 56 is connected to the free end of a lever arm 59 which controls vertical movement of a stopper 60 that acts in conjunction with a valve seat 61 to control the flow of water out through a lower port 64.

It may be noted that the valve illustrated in FIG. 2 may be one such as a valve manufactured by Armstrong Machine Works located at Three Rivers, Michigan, 49093. Such a valve is designated "Armstrong Guided Free Floating Lever Liquid Drainer".

FIG. 3 illustrates another embodiment of a combination according to the invention. Thus, it may be noted that a system according to the invention need not have more than one sump in the storage tank, if it includes a direct return into the storage tank. The system in FIG. 3 indicates an outer wall 67 of a storage tank containing a hydrocarbon product 68 therein, which may be aviation jet fuel. Inside the tank there is a dip leg conduit 71 that is shown broken off. It will be understood that conduit 71 extends down near the bottom of a sump (not shown) within the tank 67. Conduit 71 is connected to a conventional draw-off valve 72 that has the outlet thereof connected via a conduit 73 to an inlet of a float actuated valve 76. Valve 76 has a drain outlet 77 which may have a valve 78 connected thereto if desired for controlling the flow of water from the float valve 76. It will be appreciated that the valve may be like the valve illustrated in FIG. 2.

At the top of the valve 76 there is an outlet connection 81 which goes to the inlet of a hand pump 82. The outlet of the hand pump 82 is connected to one side of a sight glass 84 that has the other side thereof connected via the indicated conduits or piping 85 to a tap 86. Tap 86 goes into the inside of the tank 67 so that the liquid being circulated by the hand pump 82 will flow from the float actuated valve 76 back into the tank 67.

It has been discovered that a combination according to this invention has many advantages over any known prior arrangements. For example, most prior procedures used a separate tank into which the fluid from the bottom of a storage tank was pumped and then allowed to stand for separation to again pumping product back into the storage tank. This necessitated motor driven pumping against the liquid head of the storage tank. Also, a prior procedure used added complications and higher costs in automating a separator tank.

It has been found that under prior procedures the operation of making a so called draw down of water from a storage tank took a man about two hours plus an additional 15 minutes for the same, or another man. On the other hand, by using a combination according to this invention, one man can handle the operation in about 10 minutes.

OPERATION

Referring to FIG. 1, it may be noted that a procedure for water bottoms removal in the tank 11, involves the following.

The valves 25 and 26 are opened, and the valves 37 and 40 are opened while valves 38 and 39 are closed. Of course, the valve 49 is opened to provide for drainage of any water from the float valve 43. Then with the valves as indicated, the pump 52 is operated to cause circulation of the liquid out from the sump 15 through the dip leg 17 and the connection 21 to and through the valve 37 into the upper part of the float actuated valve 43. Here the water settles and as soon as a sufficient amount accumulates, the float (e.g. float 56 illustrated in FIG. 2) rises and the valve 43 allows the water to flow out through the drain line 48 and the open drain valve 49. At the same time the hydrocarbon product is circulated back by the manual pump 52 to flow through the valve 40 and the connecting conduit 34 and 22 to the open valve 26. Then through the dip leg 18 into the sump 16 of the storage tank 11.

Since the procedure is a relatively low flow operation, there is substantially no turbulence and the water separation proceeds quickly. And, by observing the drain line 48 the cessation of water flow is noted when the float has closed the valve.

Next, the procedure is reversed since there might be some water collected in the sump 16. There valves 37 and 40 are closed while valves 38 and 39 are opened. Thereafter the manual pump 52 is again actuated and now the procedure goes in reverse from the sump 16 to the sump 15. And, as soon as there is no more water drainage observed the draw down operation is complete and the valves may be again closed.

It may be noted that in cold climates the float actuated valve, e.g. the valve illustrated in FIG. 2, will be constructed with a water drain port 90 at the bottom of the chamber in the housing 45 so that during standby conditions all water may be drained in order to prevent freezing thereof.

While particular embodiments according to the invention have been described above in considerable detail in accordance with the applicable statues, this is not to be taken as in any way limiting the invention but merely as being descriptive thereof.

I claim:

1. In combination, a storage tank having a sump in the bottom thereof for collecting heavier liquid such as water or the like,
   a dip leg conduit extending down into said sump for drawing off said heavier liquid,
   a float actuated valve having a drain outlet at the bottom for draining said heavier liquid,
   said float actuated valve also having an inlet at the side thereof for receiving said heavier liquid and an outlet at the top for circulating product liquid to said storage tank,
   a manual circulating pump,
   means for connecting said dip leg conduit to said valve inlet and said valve outlet to said circulating pump, and
   means for connecting said circulating pump to said storage tank, all whereby said heavier liquid is drained while said product liquid is returned to the tank.

2. The invention according to claim 1, wherein
   said storage tank has a plurality of sumps,
   said dip leg extends down into one of said sumps, and
   said means for connecting said circulating pump to said storage tank comprises a second dip leg extending into another of said sumps.

3. The invention according to claim 2, wherein the combination also comprises
   means for reversing the flow from said one of said sumps to the other of said sumps.

4. In combination with a storage tank for jet fuel, said tank being subject to accumulation of water therein and having a sump for receiving said water beneath said jet fuel, and a dip leg conduit extending vertically into said sump for removing said water, the improvement comprising
   a drain for carrying said water,
   a float actuated valve having an outlet connected to said drain,
   a manual pump,
   a first connection from said dip leg conduit to an inlet of said float valve,
   a second connection from said float valve to said manual pump, and
   a third connection from said manual pump into said storage tank including a sight glass for visually monitoring the liquid flow from said float valve back into said storage tank.

* * * * *